United States Patent
Schwetzler et al.

(10) Patent No.: US 7,310,998 B2
(45) Date of Patent: Dec. 25, 2007

(54) METHOD AND DEVICE FOR IMPROVING ACCURACY OF WIND TUNNEL MEASUREMENTS, PARTICULARLY FOR CORRECTING THE INFLUENCE OF A MOUNTING DEVICE

(75) Inventors: Detlev Schwetzler, Delmenhorst (DE); Peter May, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/316,151

(22) Filed: Dec. 22, 2005

(65) Prior Publication Data

US 2007/0006645 A1 Jan. 11, 2007

(30) Foreign Application Priority Data

Dec. 22, 2004 (DE) .................... 10 2004 063 096

(51) Int. Cl.
*G01M 9/00* (2006.01)
(52) U.S. Cl. ....................................... 73/147
(58) Field of Classification Search ............... 73/147
See application file for complete search history.

(56) References Cited

U.S. PATENT DOCUMENTS

| 2,448,528 | A | | 9/1948 | Heuver |
| 2,768,526 | A | | 10/1956 | Trimble, Jr. et al. |
| 3,276,251 | A | | 10/1966 | Reed, III |
| 4,116,056 | A | * | 9/1978 | Bulychev et al. ............. 73/147 |
| 4,920,791 | A | * | 5/1990 | Griffin ......................... 73/147 |
| 5,345,818 | A | * | 9/1994 | Magill et al. ................. 73/147 |

FOREIGN PATENT DOCUMENTS

| JP | 3-237335 A | 10/1991 |
| JP | 7-301578 A | 11/1995 |
| JP | 2002-323403 A | 11/2002 |

* cited by examiner

*Primary Examiner*—Andre J. Allen
(74) *Attorney, Agent, or Firm*—Christopher Paradies; Fowler White Boggs Banker P.A.

(57) ABSTRACT

A method for improving the precision of wind tunnel measurements provides a correction to reduce the influence of a suspension device. A model, such as an aircraft model, is held by the suspension device in a wind tunnel and has multiple suspension wires. By attaching one or more sleeves to each suspension wire, a plurality of measurements with identical model configuration are capable of providing data for extrapolating corrected measurement values for a plurality of aerodynamic characteristic variables measurable in a wind tunnel. Examples of sleeves include a slit along the sleeve length and an inner diameter of the sleeves selected such that the sleeve is capable of being pressed onto and removed from a suspension wire or a sleeve of lesser outer diameter.

19 Claims, 1 Drawing Sheet

METHOD AND DEVICE FOR IMPROVING ACCURACY OF WIND TUNNEL MEASUREMENTS, PARTICULARLY FOR CORRECTING THE INFLUENCE OF A MOUNTING DEVICE

This application claims the priority of German Patent Application DE 10 2004 063 096.8, filed on Dec. 22, 2004, the disclosure of which is hereby incorporated herein by reference.

This application claims the priority of German Patent Application DE 10 2004 063 096.8, filed on Dec. 22, 2004, the disclosure of which is hereby incorporated herein by reference.

The field relates to a method for improving the precision of wind tunnel measurements for correcting the influence of a suspension device, wherein a model is introduced into a wind tunnel on the suspension device, which has multiple suspension wires, and at least one sleeve is attached to each suspension wire for increasing a suspension wire diameter to an effective diameter.

Furthermore, the field relates to a device for performing the method for improving the precision of wind tunnel measurements for correcting the influence of a suspension device, wherein a model is positioned in a wind tunnel on the suspension device, which has multiple suspension wires.

According to the related art, models are introduced into the air flow of a wind tunnel with the aid of a model suspension. The selection of the optimum suspension for a specific model is performed taking the available equipment of the wind tunnel and the particular experimental criteria into consideration.

In the course of the development of wind tunnel technology until now, manifold different embodiments of post and wire suspensions have been used.

However, all suspensions share the feature of more or less influence on the flow around the model and thus corruption of the measurement results for the model. Different measurement errors, which are to be corrected according to different methods, are caused by the type of the suspension as a function of the method being used for measuring the aerodynamic forces, such as a wind tunnel balance, which is inside the model or external.

Models having internal balances have the advantage, for example, that aerodynamic forces directly attacking the suspension are not measured as well. Therefore, only the interference between the model and the suspension as well as the tracking influences of the suspension on the model must be corrected. However, the internal balances have the disadvantage of less precision than the external balances.

External wind tunnel balances of modern construction are distinguished, in contrast, by high precision and stability. The aerodynamic forces attacking the model must be transmitted to the balance via the suspension, however. The aerodynamic force contributions of the suspension are also transmitted, if they are not able to be eliminated by shielding. The result of a measurement using an external balance thus comprises model and suspension contributions and the interference contributions between the model and the suspension. The precision of the model measurement is thus directly a function of the precision with which the direct and indirect suspension contributions contained in the measured values may be determined and corrected.

A suspension system which is often used is the "wire suspension". For this purpose, the model body to be measured is connected to the wind tunnel balance using multiple wires positioned according to a predefined scheme. The contribution of the wires contained in the measured value may be determined in different ways.

The influence of the suspension wires may be deducted numerically from the measured values. For this purpose, the suspension wires are considered in a mathematically idealized way as cylinders having transverse and diagonal flows against them. The fluidic properties of cylinders are well-known from the literature, so that the measured values may be corrected numerically accordingly to eliminate the influence of the suspension wires. In addition, an independent measurement of the wire suspension may be performed, the model being removed from the wind tunnel.

However, both methods share the feature that the interference contributions between the model and the wire suspension are not also detected, so that imprecision results in the suspension corrections ascertained using these methods. In addition, both methods require a relatively high effort.

Furthermore, JP 03 237 335 A relates to a method for measuring forces and torques which act on an aircraft model suspended on three pairs of wires in a wind tunnel. The final measurement results are each ascertained with and without air flow in the wind tunnel from the measured values using special mathematical expressions in order to register the measurement results with the greatest possible width of variation of flight states of the aircraft model. However, a measurement of air resistance forces at different suspension wire diameters of the aircraft model for computer interpolation to a suspension wire diameter of zero is not performed.

JP 2002 323 403 A shows a measurement arrangement having a frame in which a wire, which is rotatable in the longitudinal direction, is clamped. A golf ball is attached to the wire. Using a motor, the wire may be put in rotation together with the golf ball and the air resistance forces acting on the golf ball may thus be detected.

JP 07 301 578 A shows a measurement unit in a wind tunnel having a holder frame suspended movably on wires outside the wind tunnel. A sample plate is positioned inside the wind tunnel and thus in the air flow of the wind tunnel, which is in turn connected to the holder frame using struts. Using a measurement sensor, which is connected to the holder frame via a wire, the air resistance of the sample plate may be determined—independently of other forces acting on the sample plate, such as lift forces or the like—on the basis of the movable suspension of the sample plate using the wires, the holder frame, and the struts.

Measurement at different suspension wire diameters for computer interpolation to a suspension wire diameter of zero is also not performed.

According to an exemplary embodiment, the influence of the wire model suspension on wind tunnel measured values may be compensated for more precisely to achieve a higher measurement precision in comparison to the previously known methods.

According to an exemplary embodiment, a method having the features of claim 1 is provided.

According to one embodiment, a method is provided for improving the precision of wind tunnel measurements to correct the influence of a suspension device, comprising the following steps: performing at least two measurements with identical model configuration with at least one effective diameter in each case and/or at the suspension wire diameter to ascertain at least two raw measured values and ascertaining a corrected final measured value for the model from at least two raw measured values.

As defined in another embodiment of the method, at least three measurements are performed with at least one effective diameter and with the suspension wire diameter to ascertain at least three raw measured values.

This procedure may allow a sufficient precision of the correction of the influence of the suspension wires at an acceptable measuring effort.

As defined in a further embodiment of the method, the raw measured values are extrapolated to an ideal suspension wire diameter of zero to determine the final measured value.

This procedure may allow the correction of the influence of the wire suspension on the wind tunnel measurements at a comparatively low analysis effort. However, because of the nonlinear course of the drag coefficient of the wire suspension as a function of the effective diameters of the wires, at least three measurements are required for this purpose, so that a relatively high measurement effort results. The ideal suspension wire diameter of zero corresponds in this case to a model positioned in the wind tunnel on imaginary suspension wires, each of which has a diameter of zero, which model is thus positioned without contact in an ideal way and has the air flowing around it. The influence of the suspension device may thus be compensated for completely.

As defined in a further embodiment, at least two differences are ascertained in each case between two neighboring raw measured values to determine the final measured value.

This method may allow a sufficiently precise correction of the influence of the suspension device at a reduced analysis outlay.

In a further embodiment of the method, a first measurement is performed at a first effective diameter to ascertain a first raw measured value and a second measurement is performed at the suspension wire diameter to ascertain a second raw measured value, wherein the final measured value may be ascertained from the difference between the effective diameter and the suspension wire diameter as well as the difference of the raw measured values.

A sufficiently precise correction of the wind tunnel measured values may result in this way, although only two measured values are detected, an increased mathematical effort having to be used, however. The first raw measured value is ascertained using a first measurement, in which a sleeve having a specific external diameter is pushed onto each of the suspension wires to increase the particular effective diameter of the suspension wires. The second raw measured value results from a second measurement at the suspension wire diameter having completely removed sleeves. The required correction of the wind tunnel measured values may then be ascertained numerically from the two raw measured values.

As defined by a further advantageous embodiment, the measurements in the wind tunnel are performed at low flow velocities, particularly at flow velocities of less than 300 m/s.

In a further exemplary embodiment, the sleeves are particularly formed by plastic hollow cylinders and/or metal hollow cylinders.

The hollow cylindrical sleeves positioned on the suspension wires allow an exactly defined geometrical increase of the aerodynamic effective diameter of the suspension wires while maintaining the cylinder geometry typical for wind tunnel measurements in the low velocity range as precisely as possible. The internal and/or external diameters of the sleeves are tailored to one another in this case in such a way that each of these may be attached coaxially one over the other and attached to the suspension wires in the state pushed coaxially one over another as a "packet". The sleeves may be formed by plastic hollow cylinders and/or metal hollow cylinders which simultaneously have a high surface quality in order to avoid undesired measurement imprecision. Measurement imprecision of this type may be caused, for example, by surface roughness of the sleeve and/or deviations from the ideal cylinder geometry.

Alternatively, the sleeves may also be formed by coatings, by windings with films, or the like. The coatings may also be formed by plastic materials and/or bimetallic materials. However, sufficient precision of the cylinder geometry and a sufficient surface quality of the sleeves formed in this way must be ensured in order to avoid measurement imprecision.

In one example of the method, it may be advantageous to be able to remove the sleeves again from the suspension wires without detaching the model from the suspension wires.

For example, if coaxial sleeves in the form of plastic hollow cylinders are pushed onto the suspension wires, the effective diameter may be reduced exactly defined in steps by removing the particular external sleeve down to the suspension wire diameter. The sleeves may be removed, for example, by slitting, peeling off, or the like of the particular outermost sleeve.

If the sleeves are formed on the suspension wires using a coating, for example, the effective diameter may be reduced through step-by-step or continuous peeling using a suitable tool, such as an annular scraper or the like.

If the sleeves are formed on the suspension wires using wound films, for example, the effective diameter may be reduced easily through step-by-step unwinding in accordance with the requirements.

As defined by a further advantageous embodiment of the method, the raw measured values particularly represent resistance coefficients, lift coefficients, transverse force coefficients, roll torque coefficients, pitch torque coefficients, and yaw torque coefficients of the model, particularly the aircraft model, from which a corresponding corrected final measured value is ascertained.

In one example of the method, the influence of the suspension device may be compensated for in manifold different measured values.

According to another exemplary embodiment, a device is provided.

Because the suspension wires each have at least one sleeve to increase a suspension wire diameter to an effective diameter, simple and above all precise correction of the influence of the suspension wires on the wind tunnel measurements may be made possible.

Further advantageous embodiments are found in further claims.

FIG. 1 shows a diagram having measured resistance coefficients of an aircraft model suspended on a wire suspension in the wind tunnel, which are recorded, analyzed, and corrected according to a first variation of the method.

Figure 1:
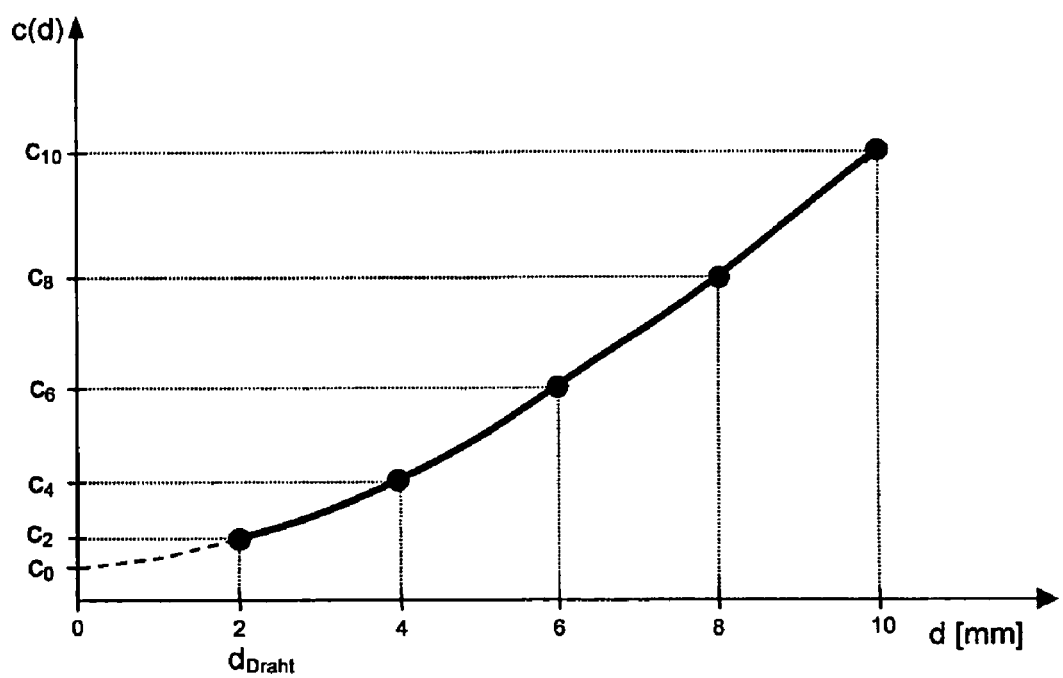
FIG. 1 shows a diagram of measured resistance coefficients of an aircraft model suspended on a wire suspension in a wind tunnel for correcting the influence of the wire suspension according to an exemplary embodiment of a method.

The particular effective diameters d of the suspension wires in millimeters are plotted on the abscissa of the diagram in FIG. 1. If no sleeve has been pushed onto the particular suspension wire to increase the effective diameter in the wind tunnel, it is assumed in the framework of the description of the method that the effective diameter is equal to the suspension wire diameter in this case. Uncorrected (raw) resistance coefficients c(d) of the aircraft model, each measured for an effective diameter, including the wire suspension and the interference between the aircraft model and the wire suspension, are plotted as examples on the ordinate.

The typical minimum diameter of suspension wires of a suspension device for aircraft models in the wind tunnel is approximately 2 mm, at least in the case of low velocity wind tunnels, in order to ensure a mechanical strength which is still sufficient. As a function of the dimensions of the aircraft model to be examined and/or of its mass, the suspension wires may also have diameters more or less than 2 mm. The suspension wire diameter without the sleeves to increase the effective diameter and/or the effective aerodynamic diameter of the bare suspension wires in the wind tunnel is thus approximately 2 mm in each case.

In the first variation of the method, initially a first sleeve having an internal diameter of somewhat more than 2 mm, for example, is pushed onto each of the suspension wires of the suspension device in a first preparatory method step, wherein a light press fit existing between the particular suspension wires and the first sleeves, so that the first sleeves may still be pushed easily onto the particular suspension wires, but there is no mechanical play. The external diameter and/or the effective diameter of the first sleeves is 4 mm, for example.

A respective second sleeve having an internal diameter of somewhat more than 4 mm is attached over each of the first sleeves, a light press fit also existing between the first sleeves and the second sleeves, so that the second sleeves may still be pushed easily onto the first sleeves, but there is no mechanical play. The external diameter and/or the effective diameter of the second sleeves is 6 mm, for example.

Finally, in the same way, a respective third sleeve having an internal diameter of somewhat more than 6 mm and an external diameter and/or an effective diameter of 8 mm is pushed onto each of the second sleeves.

As a result, a coaxial arrangement of the third, the second, and the first sleeves, as well as the suspension wires, results.

The first, the second, and the third sleeves are, for example, formed by a plastic material and essentially have a hollow cylindrical geometric design. By using a plastic material and/or a metallic material for the sleeves, the effective diameter of the suspension wires may each be reduced relatively easily and exactly defined in steps of 2 mm by removing the outer sleeve. The removal of the particular outer sleeve may be performed, for example, by peeling, slitting, unwinding, or the like of the particular outer sleeve. For this purpose, because of the coaxial arrangement of the sleeves, it is not necessary to remove the aircraft model from the wind tunnel and/or take it down from the suspension device.

Alternatively, the sleeves may also be formed by coatings, windings, or the like. In this case, a sufficient surface quality and an adequate maintenance of the cylinder geometry must be given in order to avoid measurement imprecision.

To finish the preparatory method steps, the model, such as an aircraft model, is suspended in a known way on the suspension wires of the suspension device in the wind tunnel to perform the actual measurements, for example, for the measurement of the aerodynamic force and its attack point. The forces from the model are also relayed in a known way via the suspension device having the suspension wires to a suitable measurement balance for decomposing the aerodynamic force into the components: lift, resistance, and transverse force, as well as into the torques: roll, pitch, and yaw torque around a selected reference point. In a known way, the dimensionless coefficients, such as the resistance coefficients, are calculated from the measured forces and torques.

In a first method step, for example, a resistance coefficient $c_8$ of the aircraft model, including the suspension device and the interference between the suspension device and the aircraft model, is measured at an effective diameter of the suspension wires of 8 mm in each case.

To prepare for the second method step, first, the third sleeve is removed from the suspension wires of the suspension device, so that the suspension wires only still have an effective diameter of 6 mm in each case.

In the second method step, for example, a resistance coefficient $c_6$ of the aircraft model including the suspension device and the interference between the suspension device and the aircraft model is measured at an effective diameter of the suspension wires of 6 mm in each case.

The procedure is repeated correspondingly in further method steps to ascertain $c_4$ and $c_2$ at an effective diameter of 4 mm and at an effective diameter of 2 mm, the effective diameter of 2 mm finally being implemented by the bare suspension wires having the suspension wire diameter.

The effective diameter of the suspension wires is reduced in the course of the method in three steps from 8 mm to 2 mm in each case. The specified dimensional ratios are only exemplary specifications, so that geometric dimensions of the sleeves and/or the suspension wires deviating therefrom may be selected without leaving the basic idea of the method according to the present invention. Measurements having a larger number of effective diameters may also be performed.

The measured resistance coefficients resulting from the four raw measured values $c_8$, $c_6$, $c_4$, $c_2$, then result in the falling curve $c(d)$, shown in the diagram of FIG. 1 by a solid line at a high line thickness. In continuance of one example of the method, this measured curve, as indicated by the dashed line, is extrapolated to the final resistance coefficient $c_0$ at a suspension wire diameter of 0 mm ("ideal suspension wire diameter"). The extrapolation may be performed by any suitable, particularly nonlinear mathematical approximation method. In order to achieve the most precise possible correction of the influence of the suspension device on the measured resistance coefficients, the measurements are preferably to be performed using at least three different effective diameters of the suspension wires, through which, however, the measurement effort is significantly increased.

The interpolated resistance coefficient $c_0$ then results as the final measured value from the extrapolation, which corresponds to a resistance coefficient of the aircraft model in the wind tunnel at a theoretical, i.e., ideal suspension wire diameter of 0 mm—i.e., without any interfering influence of the suspension device. Therefore, the aerodynamic influence of the suspension device, including the interference between the aircraft model and the suspension device, is sufficiently considered and/or corrected.

The raw measured values, for example, in the form of the resistance coefficients of the aircraft model, including the model suspension, are detected for this purpose for all suspension variations in the wind tunnel, separately for every force and torque coefficient, and as a function of the particular experimental parameters (such as the Mach number, the Reynolds number, the model configuration, the angle of attack, and the angle of yaw) and each represented in a diagram comparable to the illustration of FIG. 1 and individually corrected through interpolation in order to eliminate the influence of the suspension device.

Using an example of the method, for this purpose not only resistance coefficients of aircraft models in the wind tunnel, but rather also lift coefficients, transverse coefficients, roll torque coefficients, pitch torque coefficients, and yaw torque coefficients from wind tunnel measurements may be corrected in consideration of the influence of the suspension device. The diagram of FIG. 1 shows, in summary, an example for the measured resistance coefficients of a model configuration at different wire suspension diameters at constant Mach number and constant angle of attack and/or yaw in each case.

Figure 2:
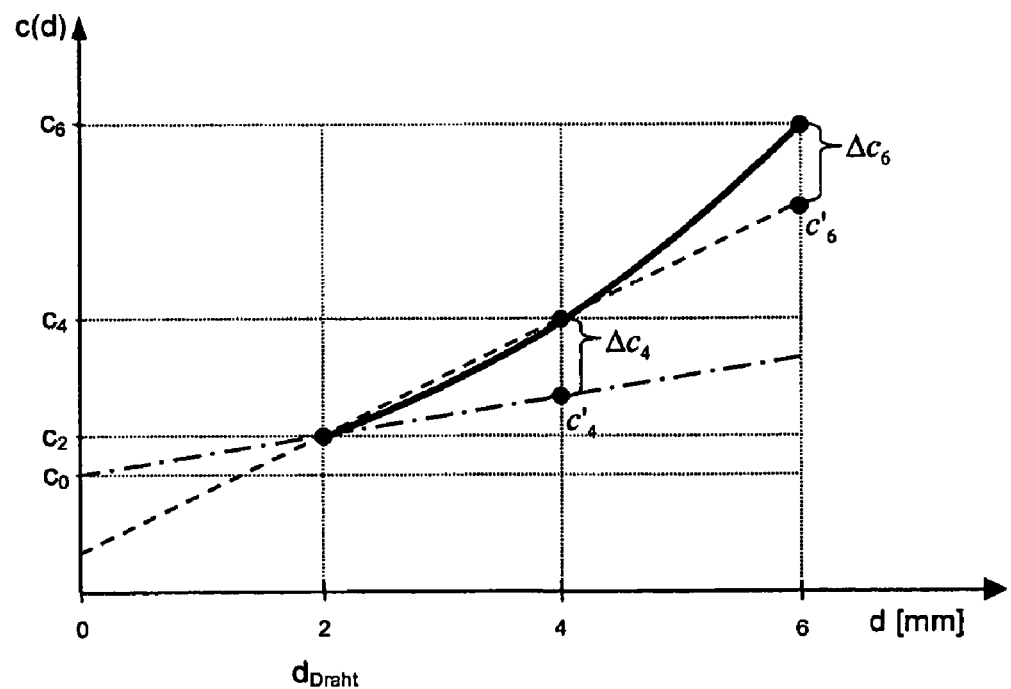
FIG. 2 shows a diagram to illustrate a method according to another exemplary embodiment.

FIG. 2 shows a further diagram to illustrate a second variation of the method, according to which only three raw measured values $c_2$, $c_4$, $c_6$ are measured at the effective diameters $d_2$, $d_4$, $d_6$ of the suspension wires. The measurement curve c(d), which increases with increasing effective diameter, is illustrated in the diagram of FIG. 2 by the solid curve drawn with high line thickness. Furthermore, it is assumed in the analysis that $\Delta c_4$ is equal to $\Delta c_6$. Firstly, $$\frac{c_4 - c_2}{d_4 - d_2} = \frac{c'_6 - c_2}{d_6 - d_2}$$

applies (Equation 1). Furthermore, it follows from the diagram of FIG. 2 that $\Delta c_6 = c_6 - c'_6$ (Equation 2). Furthermore, the relationship $$\frac{c_2 - c_0}{d_2 - d_0} = \frac{c'_4 - c_0}{d_4 - d_0}$$

also applies (Equation 3). Finally, the relationship $\Delta c_4 = c_4 - c'_4 = \Delta c_6 = c_6 - c'_6$ also applies (Equation 4). If $d_0 = 0$ is now set for an imaginary suspension wire diameter of zero, the desired value for the final measured value results from Equation 3 $c_0$ to $$c_0 = \frac{d_2 \cdot c'_4 - d_4 \cdot c_2}{d_2 - d_4}$$

(Equation 5). In addition, it follows from Equation 4 through reforming that $c'_4 = c_4 - c_6 + c'_6$ (Equation 6). Furthermore, it follows from Equation 1 that $$c'_6 = c_2 + (c_4 - c_2) \cdot \frac{d_6 - d_2}{d_4 - d_2}$$

(Equation 7). If one now inserts Equation 7 in Equation 6, after reforming and factor out, $$c'_4 = c_2 \cdot \left(1 - \frac{d_6 - d_2}{d_4 - d_2}\right) + c_4 \cdot \left(1 + \frac{d_6 - d_2}{d_4 - d_2}\right) - c_6 = A.$$

If the complete term A is inserted in Equation 5, the desired final value, which has had the influence of the suspension wires and the interactions between the aircraft model and the suspension wires removed, results $c_0$ to $$c_0 = \frac{d_2 \cdot A - d_4 \cdot c_2}{d_2 - d_4}.$$

The analysis is then performed in a similar way as in a third variation described in the following, it not being necessary because of the three raw measured values used $c_2$, $c_4$, $c_6$, however, to take a factor for k from relevant tabular works on flow mechanics (see below).

According to the third variation of the method, the corrected resistance coefficients of an aircraft model are ascertained from only two measured values, through which a significantly reduced measurement effort results in comparison to the first and second variations, while still having a well acceptable measurement error. The influence of the contributions of the suspension device is essentially determined from the measured difference of two different suspension wire diameters with identical experimental conditions in each case, i.e., particularly with identical spatial arrangement of the model in the wind tunnel and identical flow velocity of the air in the wind tunnel. The ascertained suspension contributions for the differential diameter are then converted according to the present invention to the wire diameter of the suspension device without the sleeves pushed on ("base suspension") and subtracted from the measured values of the measurement "model with base suspension".

The resistance coefficient c of a model, particularly an aircraft in the wind tunnel, follows from the general relationship $$c = \frac{W}{q_\infty \cdot F},$$

the formula $$q_\infty = \frac{\rho}{2} \cdot v^2$$

applying for the dynamic pressure $q_\infty$. For this purpose v is the flow velocity of the air in the wind tunnel and $\rho$ is the density of the air, which is a function of the pressure and the temperature, among other things. The measured overall resistance coefficient c of the aircraft model in the wind tunnel results from the sum of the force of the aircraft model $W_{Model}$, the force of the suspension device $W_{wire}$, and the interference forces $\Delta W_{Interference}$ between the aircraft model and the suspension device, each in the w direction.

According to one example, in a first measurement, a first resistance coefficient $c_{D\ 2} = c_{DModel} + c_{DA\ 3.2F}$ of the aircraft model including the wire suspension device and the interference and/or interactions resulting therefrom is measured. For this first measurement, sleeves having an external diameter and/or an aerodynamic effective diameter of 3.2 mm are pushed onto each of the suspension wires. An aerodynamic effective diameter of the suspension wires of 3.2 mm results in this way.

Subsequently, all sleeves are removed from the suspension wires and a second measurement is performed at the suspension wire diameter of 2.0 mm, i.e., with bare suspension wires without sleeves pushed on, and unchanged model configuration to ascertain a second resistance coefficient $c_{D\,2}=c_{D\,Model}+c_{DA\,2.0F}$. The index F stands for the resistance coefficients in relation to the model area F for this purpose. The resistance coefficient of the aircraft model is represented in both equations by the term $c_{D\,Model}$.

Therefore, $\Delta c_D = \Delta c_{D1} - \Delta c_{D2} = c_{D\,Model} + c_{DA\,3.2F} - c_{D\,Model} + c_{DA\,2.0F} = c_{DA\,3.2F} - c_{DA\,2.0F}$, the resistance $c_{D\,Model}$ of the model cancel out due to the difference calculation.

Furthermore, a value $$k = \frac{c_{DA\,3.2}}{c_{DA\,2.0}}$$

is determined from a relevant tabular work for flow mechanics. The quotient $c_{DA\,3.2}$ corresponds in this case to the resistance coefficient of an ideal cylinder having an external diameter of 3.2 mm under the experimental conditions given here, particularly the flow velocity of the air in the wind tunnel. The dividend $c_{DA\,2.0}$ correspondingly stands for the resistance coefficient of an ideal cylinder having an external diameter of 2.0 mm under the conditions existing here in the wind tunnel.

Furthermore, $$c_{DA\,2.0F} = \Delta c_D \cdot \left( \frac{1}{k \cdot \frac{d_{3.2}}{d_{2.0}} - 1} \right)$$

applies. In this equation, the values of 3.2 mm and 2.0 mm are to be used for $d_{3.2}$ and $d_{2.0}$ for the aerodynamic effective diameter of the suspension wires (aerodynamic effective area). $\Delta c_D$ follows directly from the substraction of the two measured resistance values $c_{D1}$ and $c_{D2}$ (see above). The value of k results, as already noted, from the relevant known tabular works of flow mechanics.

The resistance coefficient $c_{D\,Corrected}$ corrected according to one example, i.e., with the influence of the suspension device removed, of the aircraft model finally follows from the relationship $c_{D\,Corrected} = c_{D\,2} - c_{DA\,2.0\,F}$, the value $c_{D\,2}$ being the second measured, uncorrected (raw) resistance coefficient, which was ascertained at an effective diameter of 2.0 mm and/or using the bare suspension wires without the sleeves pushed on.

The advantage of the third variation in relation to the first and the second variations of the method particularly has its basis in that only two measurements are performed in the wind tunnel using two different effective diameters of the suspension wires and nonetheless a sufficient precision of the correction is achieved.

Furthermore, it is to be noted that "comprising" does not exclude other elements or steps and "a" or "an" does not exclude multiples. In addition, it is to be noted that features or steps which have been described with reference to one of the above exemplary embodiments may also be used in combination with other features or steps of other exemplary embodiments described above. Reference numbers in the claims are not to be viewed as a restriction.

The invention claimed is:

1. A method for improving a precision of wind tunnel measurements to correct the influence of a suspension device, comprising:

introducing a model into a wind tunnel on the suspension device, the suspension device having a plurality of suspension wires;

performing a plurality of measurements using an identical model configuration such that a raw measured value is ascertained for each of the plurality of measurements;

attaching at least one sleeve to each suspension wire during at least one of the plurality of measurements during the step of performing, wherein the at least one sleeve has an effective diameter greater than a suspension wire diameter of the plurality of suspension wires; and ascertaining a corrected final measured value for the model using the raw measured values for each of the plurality of measurements ascertained from the steps of performing and attaching.

2. The method of claim 1, wherein the step of performing includes performing at least three measurements, and two of the at least three measurements are performed using a first sleeve having an effective diameter greater than the diameter of the suspension wires and a second sleeve having an effective diameter greater than the effective diameter of the first sleeve.

3. The method of claim 2, wherein the step of ascertaining includes extrapolating raw measured values to an ideal suspension wire diameter of zero to determine the corrected final measured value.

4. The method of claim 2, wherein the step of ascertaining a corrected final measured value uses at least two differences ascertained between at least two neighboring raw measured values in each case to determine the corrected final measured value.

5. The method of claim 2, further comprising a step of reducing the effective diameter of each of the at least one sleeves attached to the plurality of suspension wires in steps after each of the plurality of measurements during the step of performing, by removing one of the at least one sleeves attached in the step of attaching.

6. The method of claim 5, wherein the step of reducing reduces the effective diameter of each the at least one sleeves attached to the plurality of suspension wires until the suspension wire diameter is reached.

7. The method of claim 1, wherein the step of performing includes performing a first measurement at a first effective diameter to ascertain a first raw measured value and performing a second measurement at the suspension wire diameter to ascertain a second raw measured value, wherein the step of ascertaining the corrected final measured value uses the difference in diameter between the effective diameter and the suspension wire diameter and between the first raw measured value and the second raw measured value.

8. The method of claim 1, further comprising connecting the suspension device to a measurement balance, prior to the step of performing.

9. The method of claim 8, wherein the step of performing includes using flow velocities of less than 300 m/s.

10. The method of claim 8, further comprising forming of the sleeves using plastic hollow cylinders, metal hollow cylinders, or both thereof.

11. The method of claim 8, wherein the step of attaching includes pushing a first sleeve, whose internal diameter approximately corresponds to the suspension wire diameter, onto each suspension wire to increase the effective diameter.

12. The method of claim 11, wherein the step of attaching includes pushing a plurality of additional sleeves onto the first sleeve to increase the effective diameter, an internal diameter of the additional sleeves approximately corresponding to an external diameter of the first sleeve or to an external diameter of a preceding one of the additional sleeves.

13. The method of claim 8, wherein the step of ascertaining the corrected final measured value includes using the raw measured values to ascertain corrected final measured values of resistance coefficients, lift coefficients, transverse force coefficients, rolling torque coefficients, pitch torque coefficients, and yaw torque coefficients of the model.

14. The method of claim 8, wherein the step of introducing a model includes selecting the model to be an aircraft model.

15. A device for improving the precision of wind tunnel measurements, comprising:

a model positioned in a wind tunnel; a suspension device, having a plurality of suspension wires, each of the plurality of suspension wires having a suspension wire diameter; and at least one sleeve detachably attached to each of the plurality of suspension wires, the at least one sleeve having an effective diameter greater than the suspension wire diameter.

16. The device of claim 15, wherein the at least one sleeve is formed of a plastic hollow cylinder, a metal hollow cylinder, or both thereof.

17. The device of claim 15, wherein a first sleeve, whose internal diameter approximately corresponds to the suspension wire diameter, is detachably attached to each of the plurality of suspension wires.

18. The device of claim 17, wherein the at least one sleeve includes additional sleeves, each having an internal diameter about the same as an external diameter of the first sleeve or a preceding one of the additional sleeves attached to each first sleeve.

19. The device of claim 15, wherein the model is an aircraft model.

* * * * *